United States Patent [19]
Ochiai

[11] Patent Number: 5,457,544
[45] Date of Patent: Oct. 10, 1995

[54] FACSIMILE DEVICE WITH MEMORY CONTROL MEANS FOR STORING IMAGE DATA TO BE TRANSMITTED AND IMAGE DATA RECEIVED

[75] Inventor: Masato Ochiai, Tokyo, Japan

[73] Assignee: Canon Kabushiki Kaisha, Tokyo, Japan

[21] Appl. No.: 280,566

[22] Filed: Jul. 25, 1994

Related U.S. Application Data

[63] Continuation of Ser. No. 921,341, Jul. 29, 1992, abandoned.

[30] Foreign Application Priority Data

Jul. 31, 1991 [JP] Japan ................................. 3-214748
Jul. 15, 1992 [JP] Japan ................................. 4-210926

[51] Int. Cl.⁶ ..................................................... H04N 1/21
[52] U.S. Cl. ........................................ 358/404; 358/444
[58] Field of Search ................................. 358/404, 444, 358/442, 443, 433, 426, 261.1, 468; 395/114, 115, 116

[56] References Cited

U.S. PATENT DOCUMENTS

| | | | |
|---|---|---|---|
| 4,743,975 | 5/1988 | Ijuin. | |
| 4,841,373 | 6/1989 | Asami et al. | 358/404 |
| 5,119,210 | 6/1992 | Baba | 358/404 |
| 5,142,667 | 8/1992 | Dimperio et al. | 395/115 |
| 5,229,866 | 7/1993 | Kashiwagi et al. | 358/444 |

FOREIGN PATENT DOCUMENTS

| | | |
|---|---|---|
| 0337772 | 10/1989 | European Pat. Off.. |
| 0430452 | 6/1991 | European Pat. Off.. |
| 0148467 | 9/1982 | Japan ................... 358/404 |
| 59-185469 | 10/1984 | Japan. |
| 3070359 | 3/1991 | Japan. |

OTHER PUBLICATIONS

Patent Abstracts of Japan, vol. 15, No. 233 (E-1077), Jun. 14, 1991.
Patent Abstracts of Japan, vol. 9, No. 47 (E-299), Feb. 27, 1985.
E Fax 3 Release A User's Manual, (First Edition), by Everex Systems, Inc. (1990), pp.:3-1,2,3;5-7;12-5,6,7.

Primary Examiner—Scott A. Rogers
Attorney, Agent, or Firm—Fitzpatrick, Cella, Harper & Scinto

[57] ABSTRACT

A facsimile device comprises read means for reading a document; image memory means for storing image information of the document read by the read means; transmission means for transmitting the image information of the image memory means; and control means for controlling the reading of the document, the storing of the read image information and the reading of the stored image information and parallelly executing the storing and the transmission of the image information. The control means reads the document asynchronously with the transmission of the image information until the amount of image information in the image memory means reaches a predetermined amount.

3 Claims, 20 Drawing Sheets

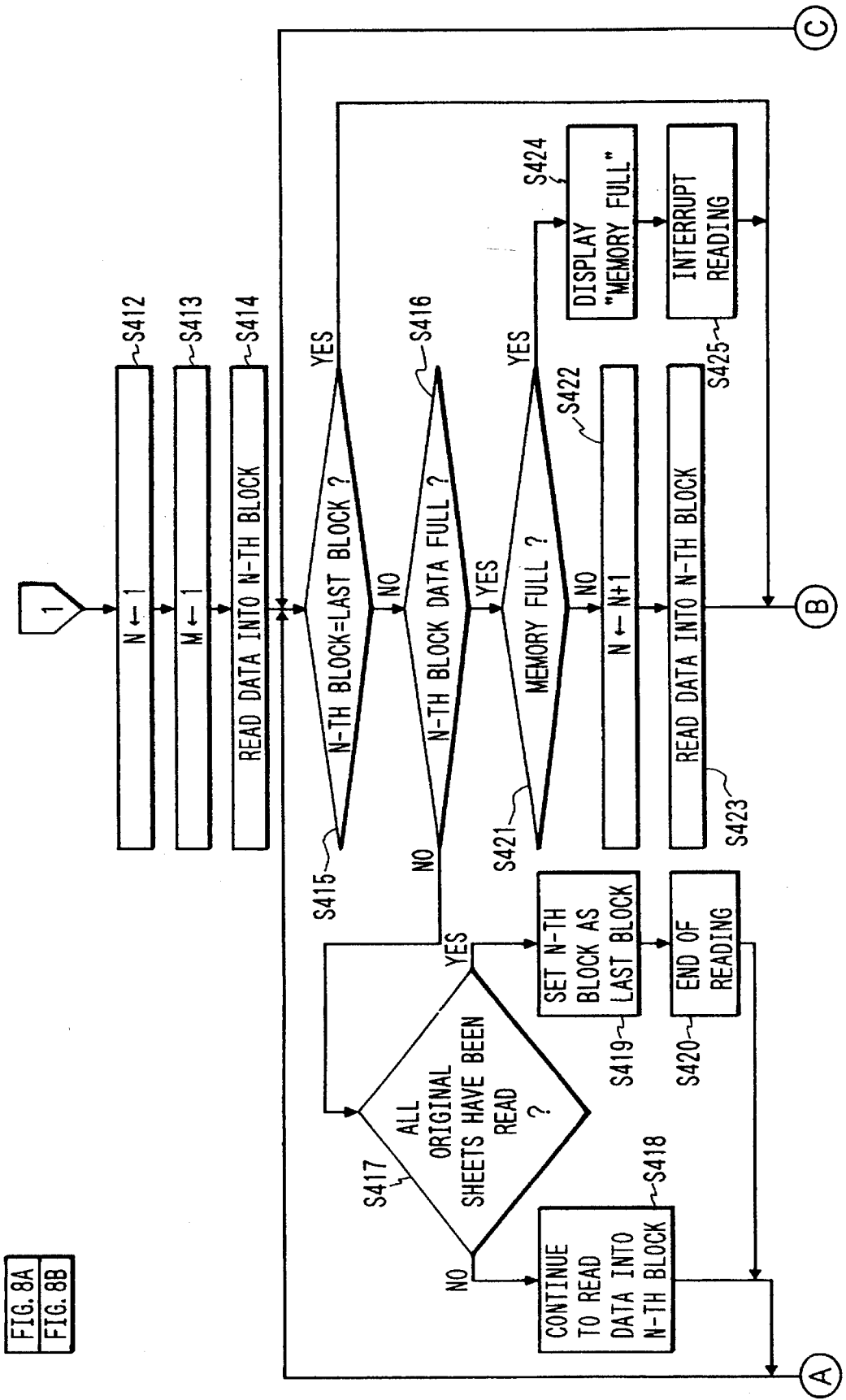

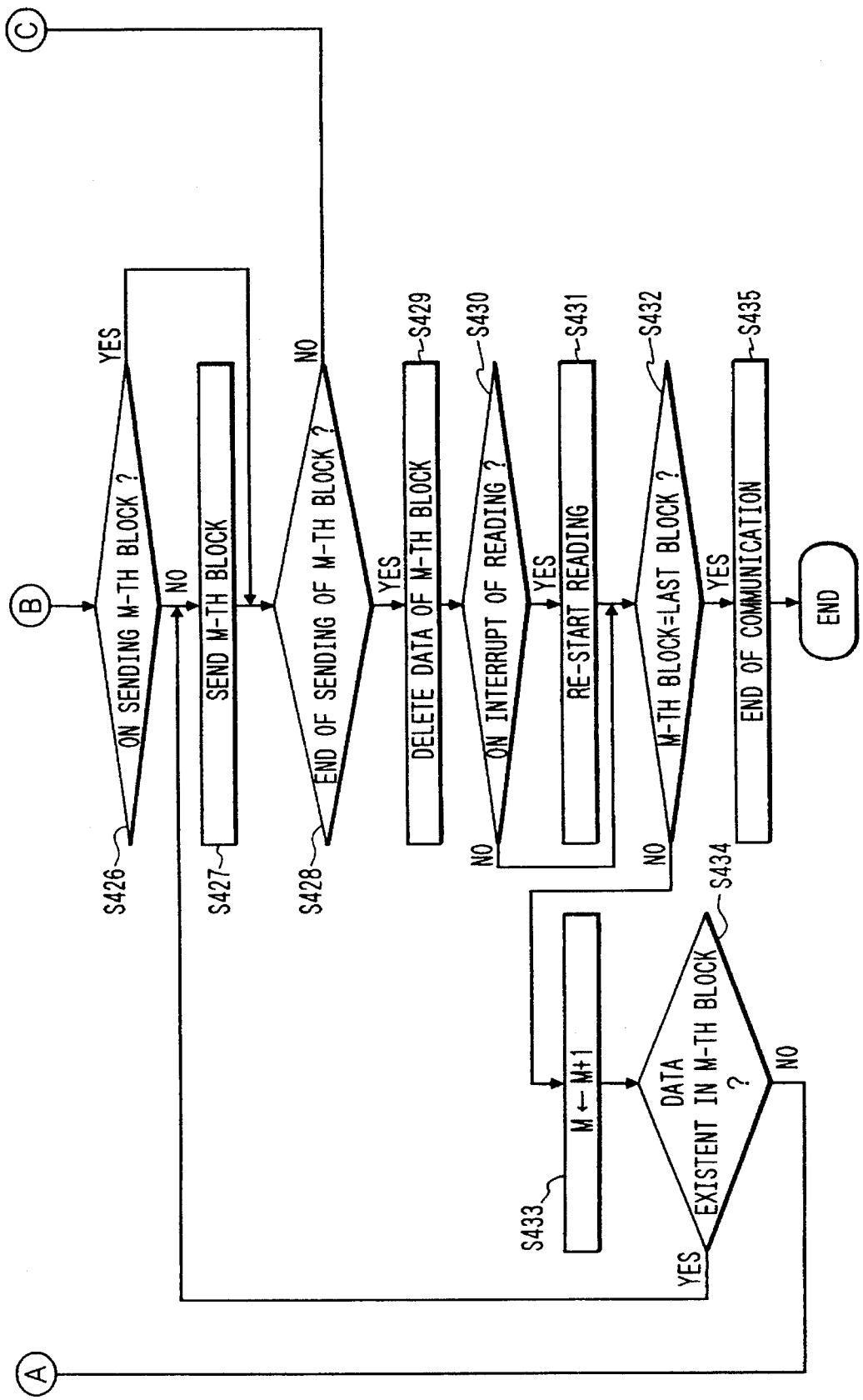

☐ MEMORY BLOCK VACANT (AVAILABLE)

▦ MEMORY BLOCK FULL

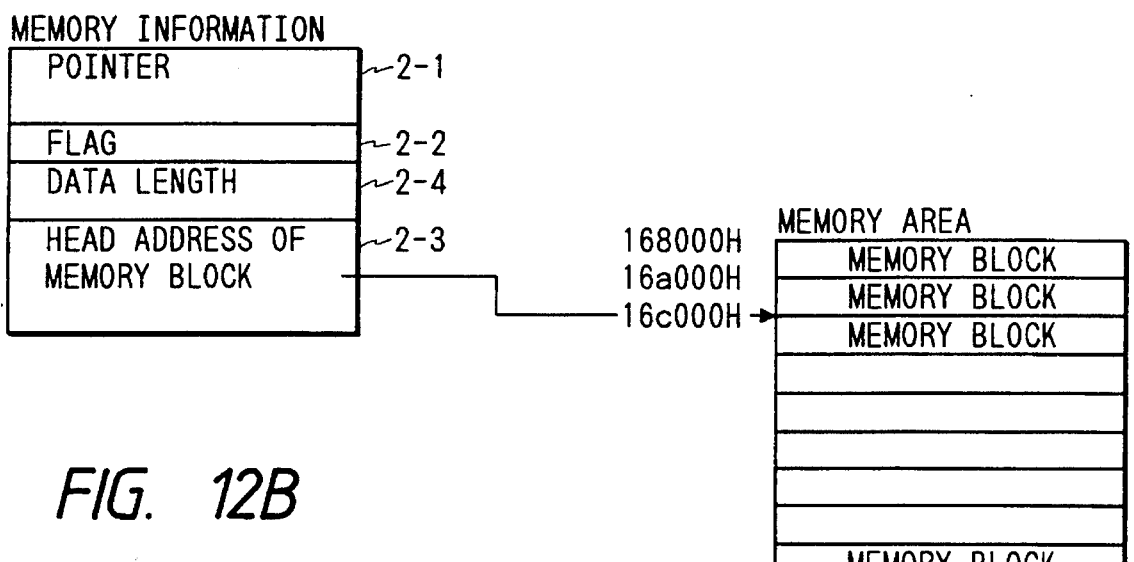
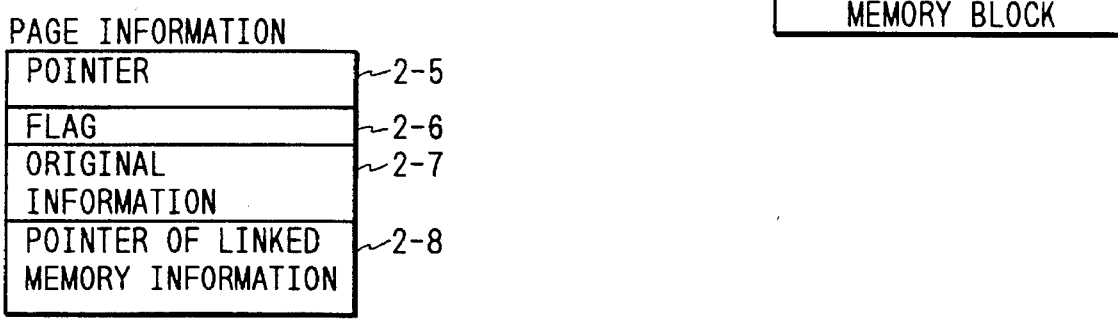
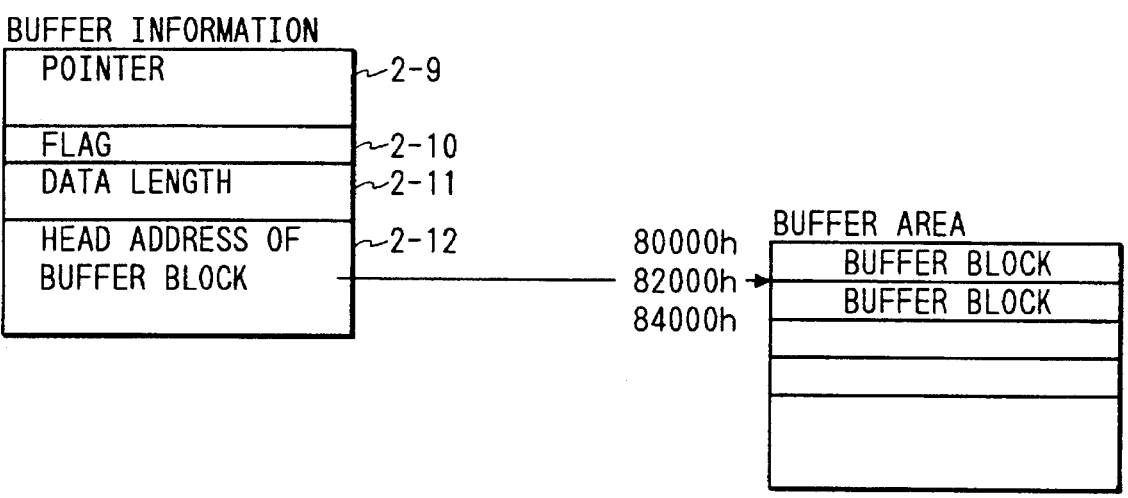

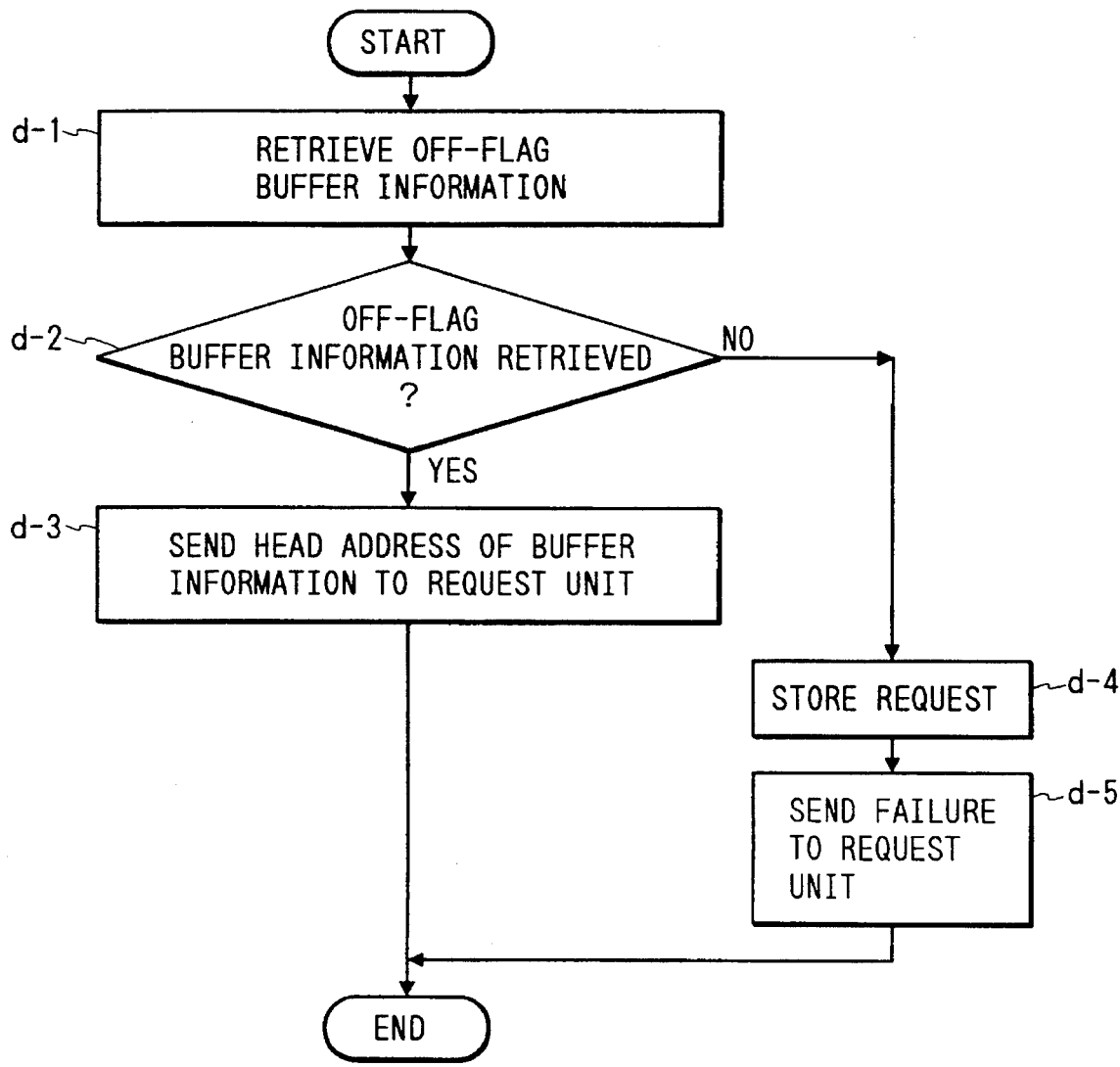

FACSIMILE DEVICE WITH MEMORY CONTROL MEANS FOR STORING IMAGE DATA TO BE TRANSMITTED AND IMAGE DATA RECEIVED

This application is a continuation of application Ser. No. 07/921,341 filed Jul. 29, 1992 now abandoned.

BACKGROUND OF THE INVENTION

1. Field of the Invention

The present invention relates to a facsimile device having an image memory.

2. Related Background Art

In a prior art facsimile device having an image memory, when a document image is to be sent, the read document image is stored in the image memory and the document image is read from the image memory after the entire document image has been stored in the image memory (a store-and-send method). The store-and-send method is advantageous over a simultaneous send method in which a document is sent while it is read in that the document can be read faster so that an operator can sooner bring the document back. However, it has the following disadvantages.

In the store-and-send method, a large capacity image memory is required because the document is temporarily read into the image memory. Further, an image converter and a decoder are required to convert the read image data to be compatible to a receiving capability of a receiving device because a call to and negotiation with the receiving device are made after the document has been read.

The store-and-send method is described in U.S. Pat. Nos. 4,796,092, 4,814,890, 4,772,955, 4,845,569, 4,827,349, 4,811,385 and 4,922,349 but none of them proposes a solution to the above problems.

SUMMARY OF THE INVENTION

It is an object of the present invention to improve a facsimile device in the light of the above.

It is another object of the present invention to provide a facsimile device which can rapidly read and send a document without requiring a large capacity image memory.

It is still another object of the present invention to provide a facsimile device which attains high speed processing without requiring a large capacity image memory which has been needed in the prior art store-and-send method and without requiring the conversion of the stored image data when it is to be sent.

Other objects of the present invention will be apparent from the following detailed description and the accompanying drawings.

BRIEF DESCRIPTION OF THE DRAWINGS

FIG. 8 shows a flow chart of an operation in the embodiment, FIGS. 12A to 12C show structures of data managed by a memory control unit in the embodiment, FIGS. 15A to 15G show flow charts of CPU processing.

DETAILED DESCRIPTION OF THE PREFERRED EMBODIMENTS

An embodiment of the present invention is now described in detail with reference to the drawings.

Figure 1:
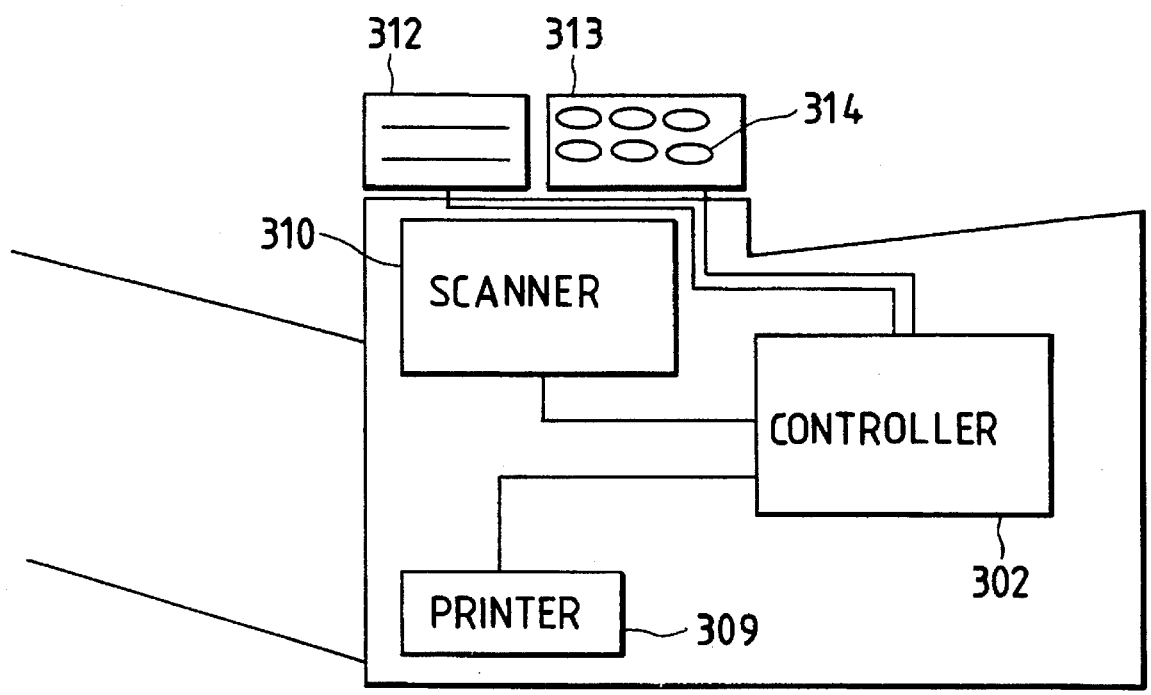
FIG. 1 shows a sectional view of one embodiment of a facsimile device of the present invention.

FIG. 1 shows a sectional view of one embodiment of the facsimile device of the present invention.

The facsimile device comprises a control unit 302 for controlling the entire device, a printer unit 309 for printing out an image on a record sheet, a scanner unit 310 capable of reading the image in accordance with a resolution power and a sheet size of a destination device, a console panel (or operation panel) 312 for displaying various messages, and a key pad 313 for entering data by keys 314.

Figure 2:
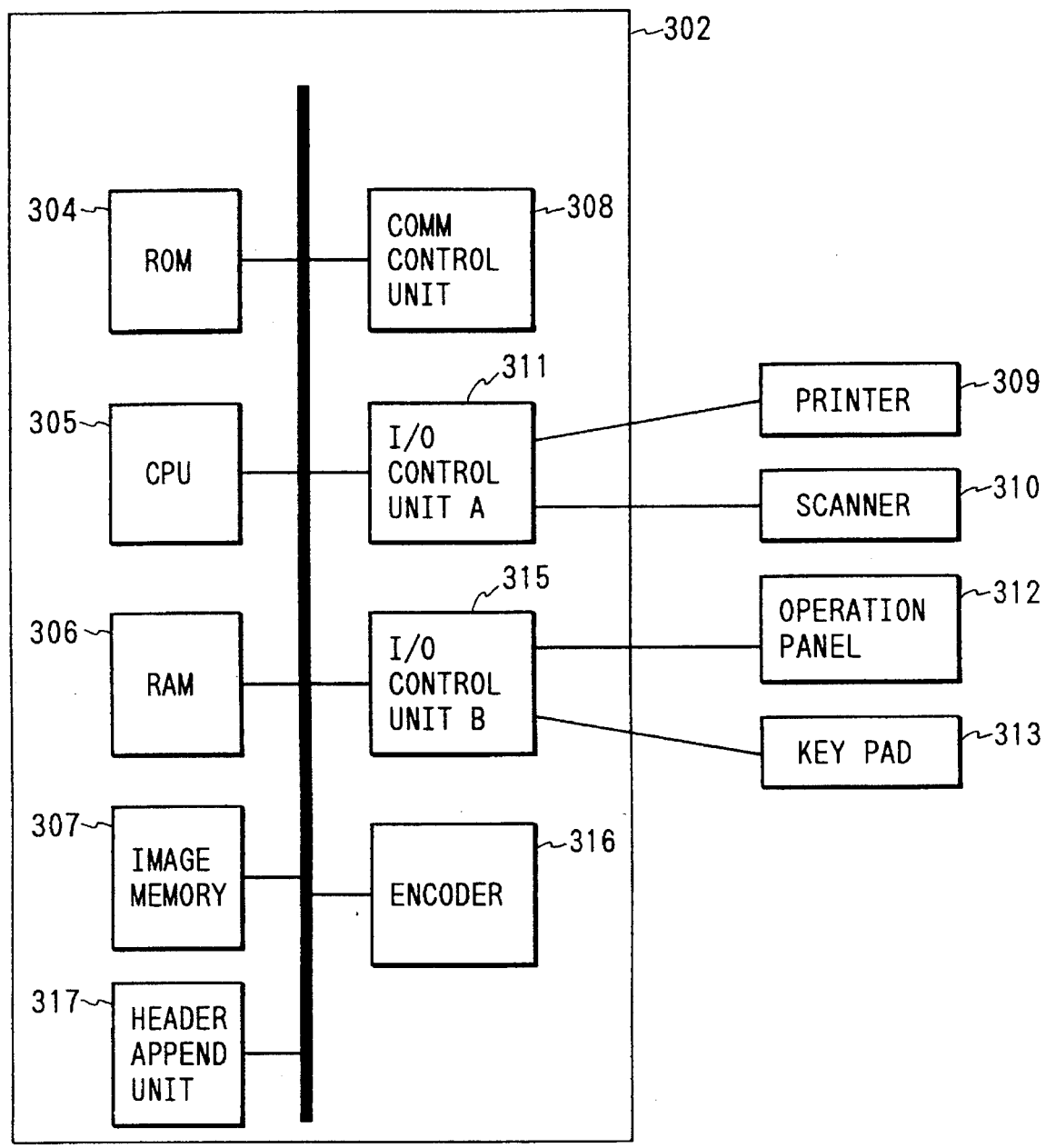
FIG. 2 shows a block diagram of a control unit in the embodiment.

FIG. 2 shows a block diagram of the control unit 302.

The control unit 302 comprises a ROM 304 which stores program, a CPU 305 for controlling the entire facsimile device in accordance with the program, a RAM 306 for temporarily storing data to be used by the CPU 305, an image memory 307 for storing image block by block, a communication control unit 308 for controlling communication, an I/O control unit (A) 311 for controlling the printer unit 309 and the scanner unit 310, an I/O control unit (B) 315 for controlling the console panel 312 and the key pad 313, an encoder 316 capable of encoding in accordance with an encoding system of the destination device, and a header appending unit 317 for appending a header to a communication document.

Figure 3:
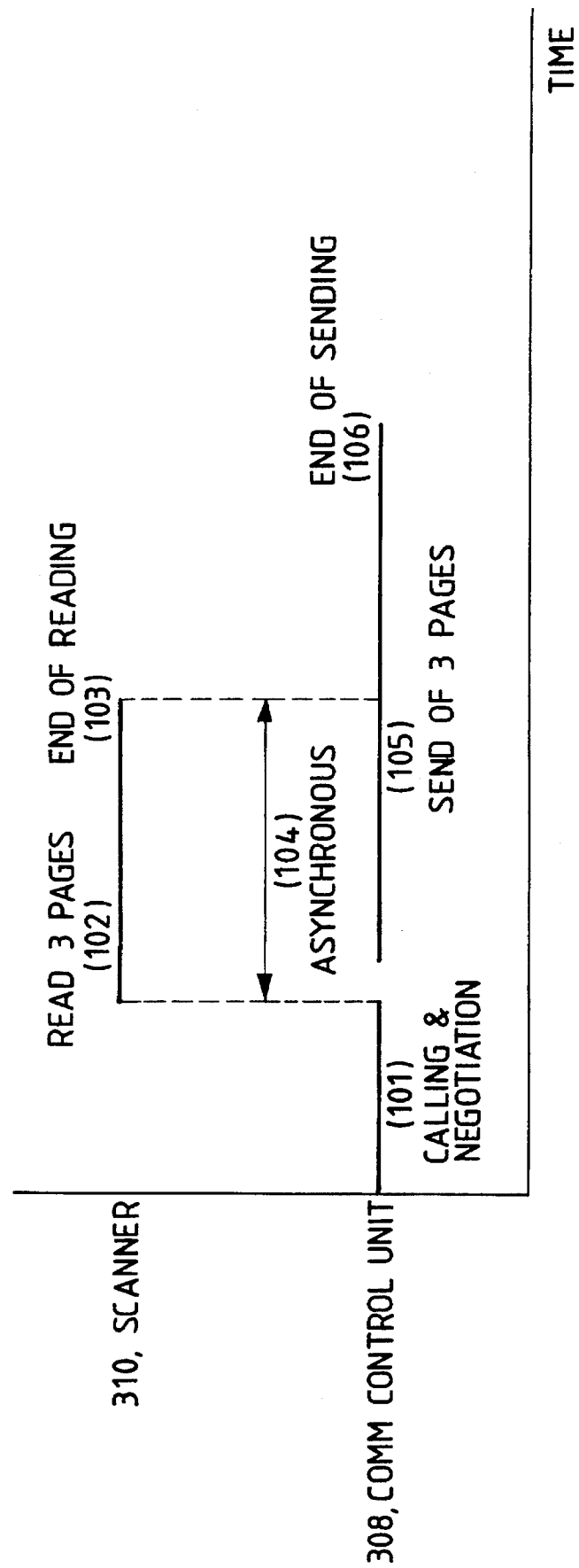
FIG. 3 shows a time chart of a process timing of a scanner unit and a communication control unit in the embodiment.

FIG. 3 shows a time chart of processing timing of the scanner unit 310 and the communication control unit 308. In FIG. 3, solid lines for the units shown on the ordinate represent the process times.

In (101) of FIG. 3, the communication control unit 308 makes a call to and negotiation with a destination device. In (102), the scanner unit 310 starts to read the entire transmission document (for example, three pages of documents when they comprise three pages), and in (103) it completes to read the entire document. In (105), the communication control unit 308 is in a send mode, and in (106) it terminates the transmission. In (104), the scanner unit 310 and the communication control unit 308 are asynchronous, that is, they operate independently (asynchronous state).

Figure 4:
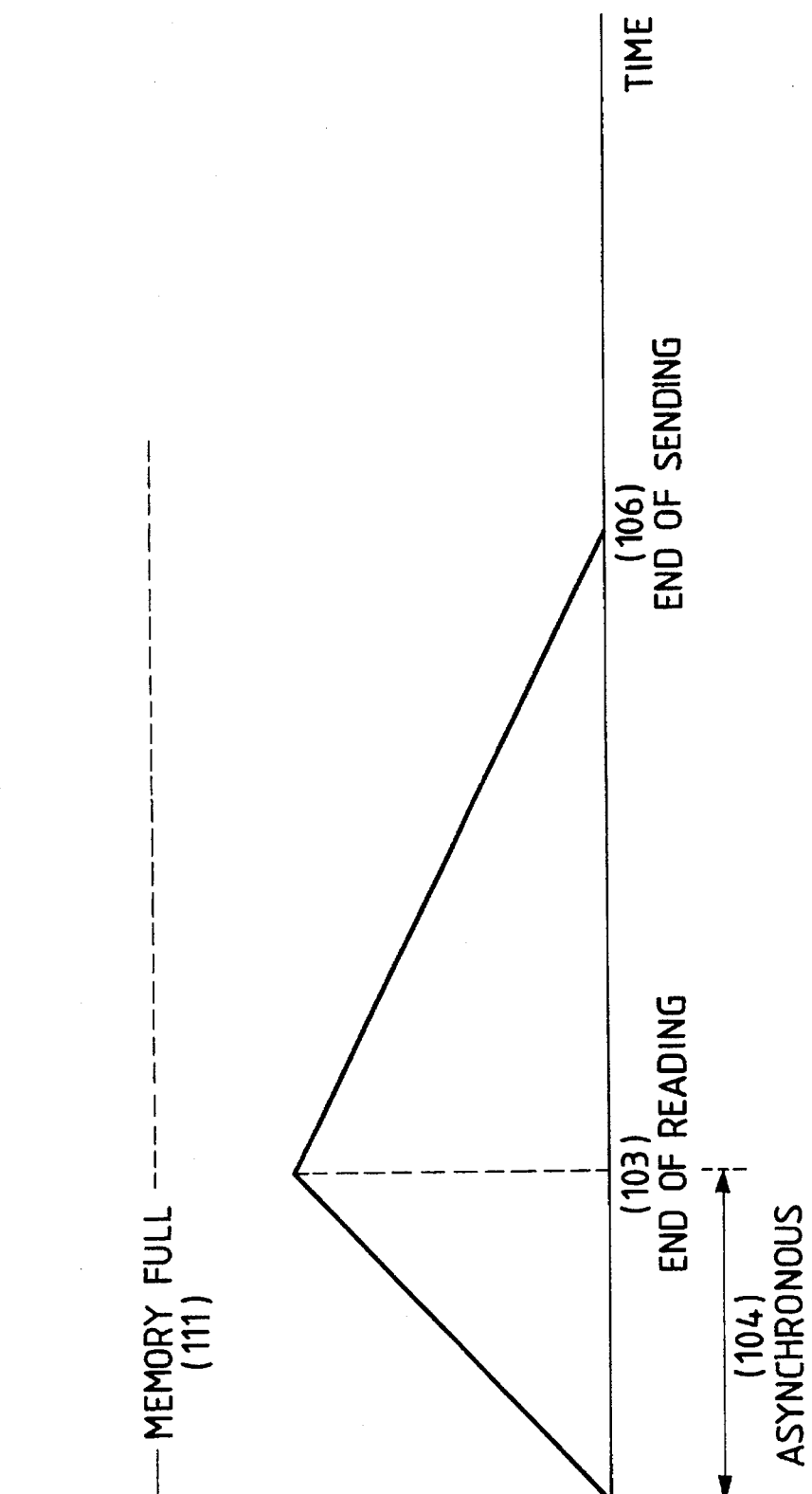
FIG. 4 shows a change in time of a memory capacity of an image memory in the embodiment.

In FIG. 4, after the call and the negotiation by the communication control unit 308 have been completed, the scanner unit 310 starts the reading and the data from the scanner unit 310 is stored in the image memory 307 so that the accumulation in the image memory increases with time. On the other hand, the stored data is sent by the transmission control.

When the scanner unit 310 has read three pages of document (103), the memory capacity is maximum and it gradually decreases, and the transmission is finally terminated (106).

While the scanner unit 310 reads the entire document, the scanner unit 310 and the communication control unit 308 operate asynchronously (104).

Figure 5:
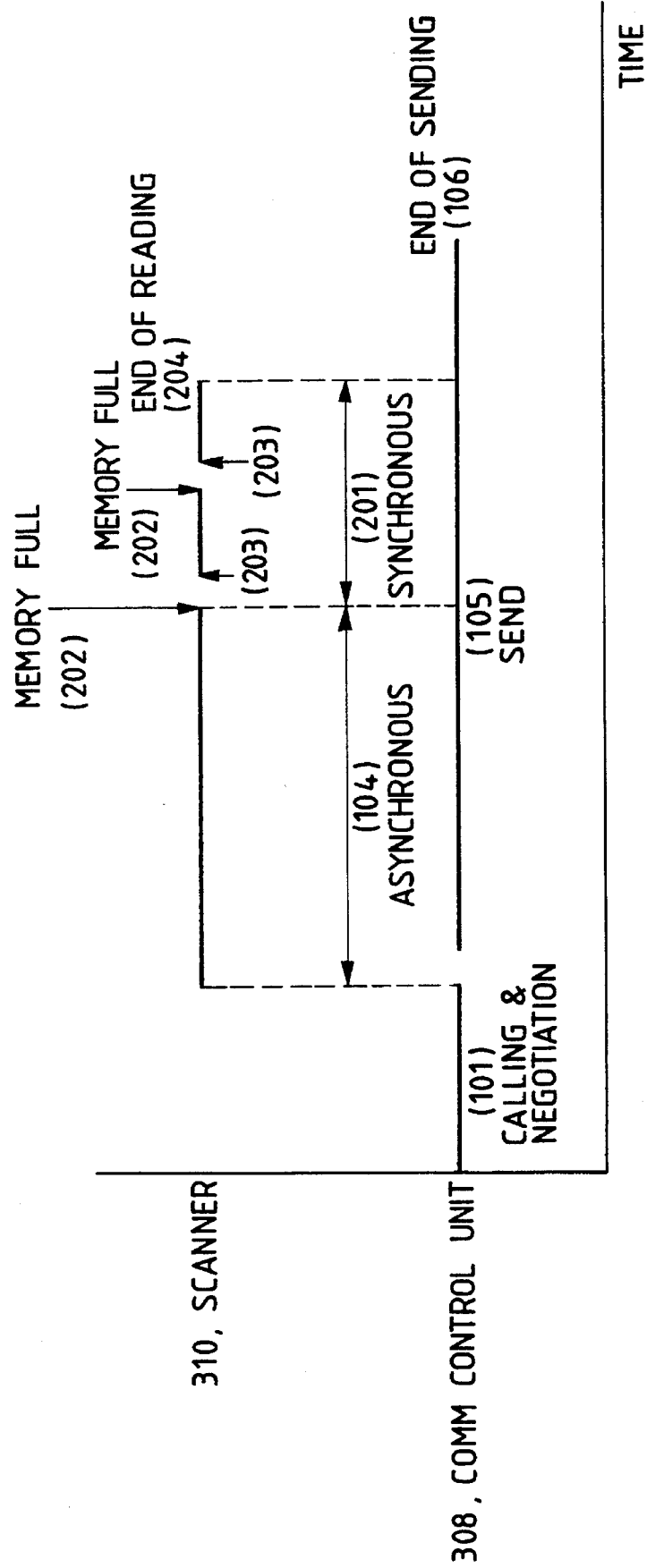
FIG. 5 shows a time chart of a process timing of the scanner unit and the communication control unit at a memory full mode in the embodiment.

FIG. 5 shows a time chart of an operation of the scanner unit 310 and the communication control unit 308 in the image memory full mode in the present embodiment. In FIG. 5, solid lines for the units shown on the ordinate represent the process times. The like operations to those shown in FIG. 3 are designated by the like numerals.

In (101) of FIG. 5, the communication control unit makes a call to and negotiation with the destination device. In (202), the reading of the document is interrupted by the memory full state. In (203), the reading is resumed by an image memory vacancy state. In (204), the entire transmission document has been read. In (106), the transmission control unit 310 terminates the transmission, and in (105), it transmits the data. In (104), the scanner unit 310 and the communication control unit 308 are asynchronous, that is, they operate independently (asynchronous state). In (201), the scanner unit 310 and the communication control unit 308 are synchronous so that the data in the memory increases and decreases.

Figure 6:
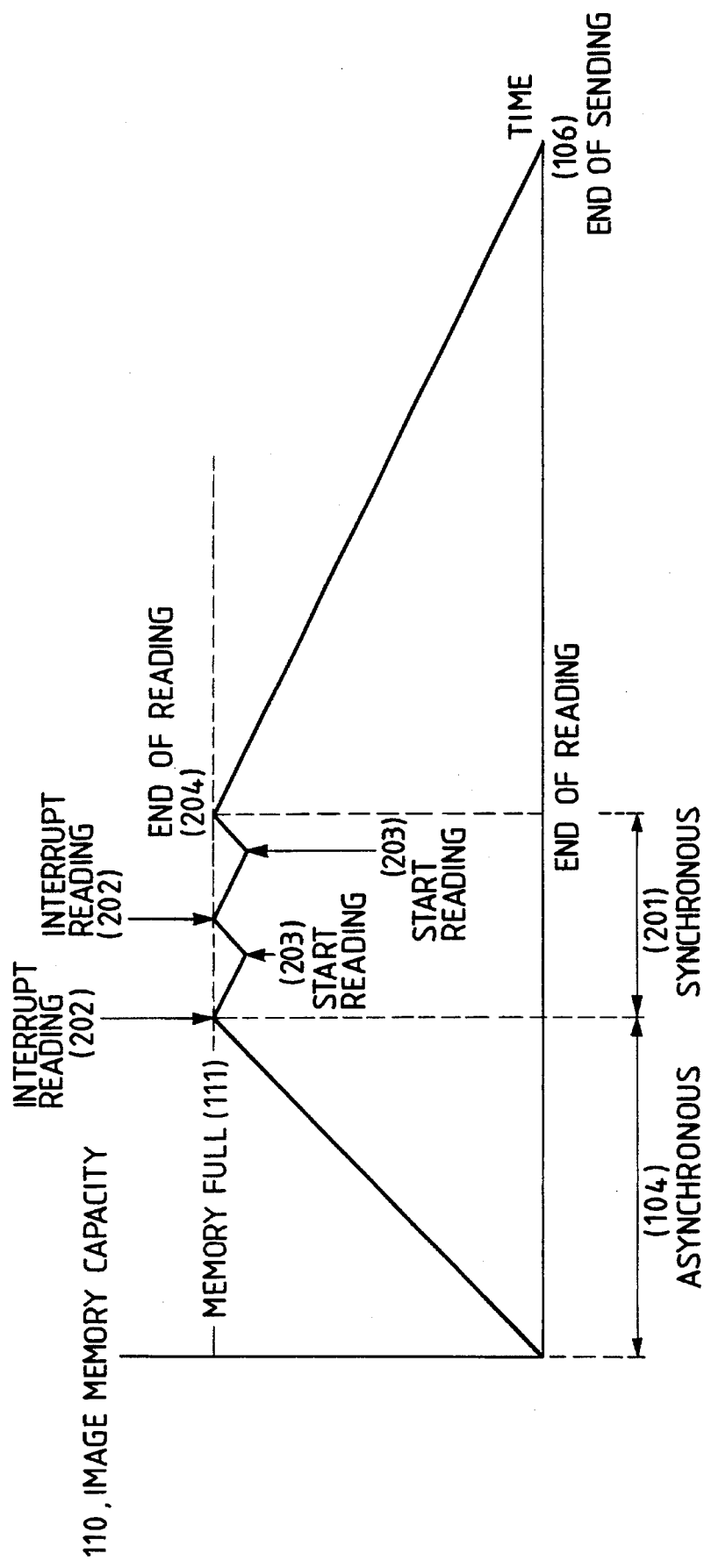
FIG. 6 shows a change in time of the memory capacity of the image memory at the memory full mode in the embodiment.

FIG. 6 shows a change in time of the memory capacity in the image memory 307. An ordinate represents an image memory capacity 110, an abscissa represents a time and a broken line represents a boundary to the memory full state.

In FIG. 5, when the call and the negotiation by the communication control unit 308 are completed (101), the scanner unit 310 starts the reading. The scanner unit 310 operates without interruption independently from the communication control unit until the memory full state is reached (202). The transmission is also done in parallel and the scanner unit 310 and the communication control unit 308 operate independently and asynchronously (104).

When the memory full state is reached, the reading is interrupted (202). The transmission is made by the transmission control unit and the reading is resumed when the image memory 307 becomes vacant (203). The interruption and the transmission are repeated until the entire document is read (204). During this period the scanner unit 310 and the communication control unit 308 operate synchronously (201).

In FIG. 6, when the call and the negotiation by the communication control unit 308 are completed, the scanner unit 310 starts the reading. The data from the scanner unit 310 is stored in the image memory and the stored data in the image memory 307 increases with time. On the other hand, the stored data is sent by the transmission control.

The scanner unit 310 interrupts the reading at the memory full state (202). It resumes the reading when the image memory 307 becomes vacant by the transmission by the transmission control (203). The interruption and the transmission are repeated until the entire document is read (204). During this period, the scanner unit 310 and the communication control unit 308 operate synchronously (201). The memory capacity decreases and increases from time to time, and after the reading has been completed, the memory capacity gradually decreases and the transmission is finally terminated (106).

Figure 7:
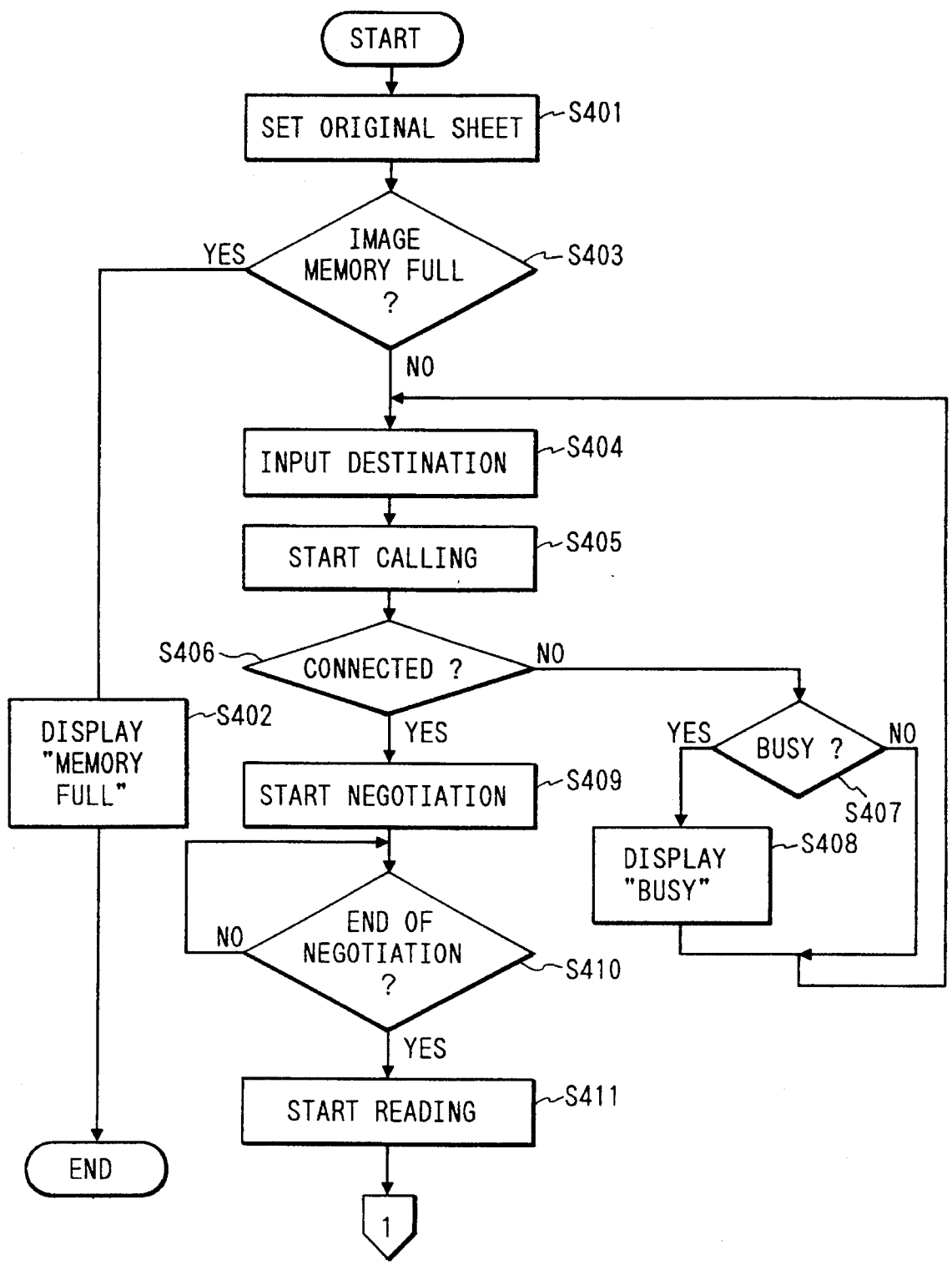
FIG. 7 shows a flow chart of an operation in the embodiment.
Figure 9:
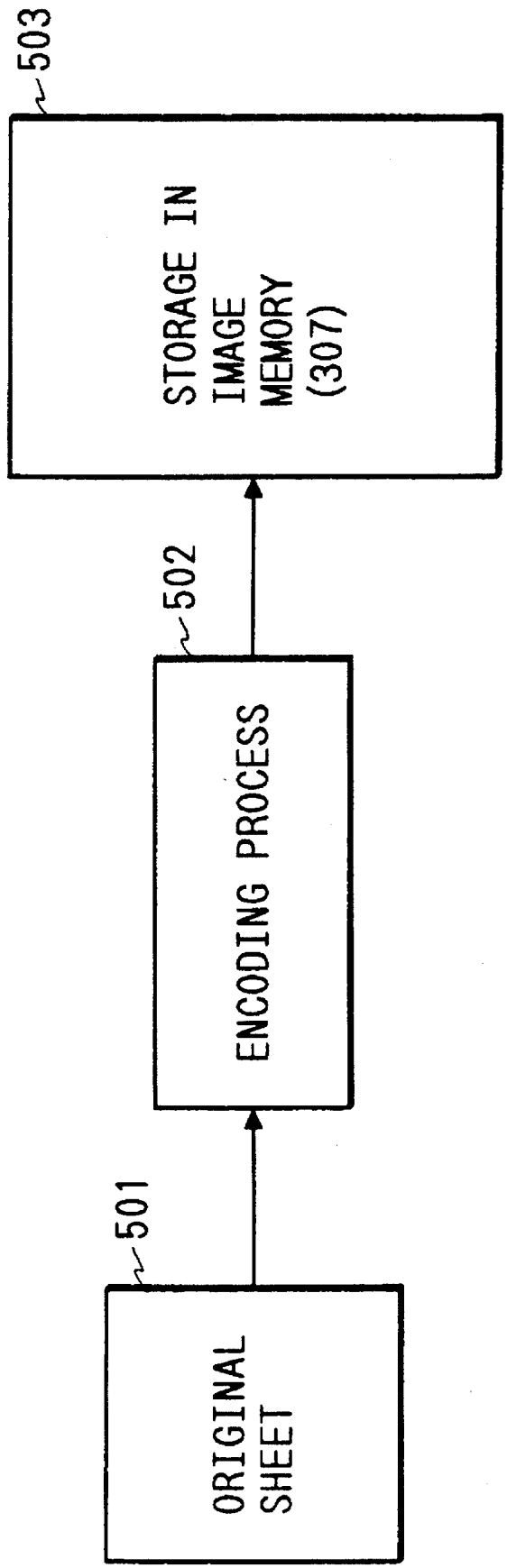
FIG. 9 shows a block diagram of a flow of image data in the embodiment.

FIGS. 7 and 8 show flow charts of processes in the present embodiment and FIG. 9 shows a block diagram of flow of image data in the present embodiment.

The image data read from the transmission document (501) is encoded (502) and stored in the image memory 307 (503).

Figure 10A:
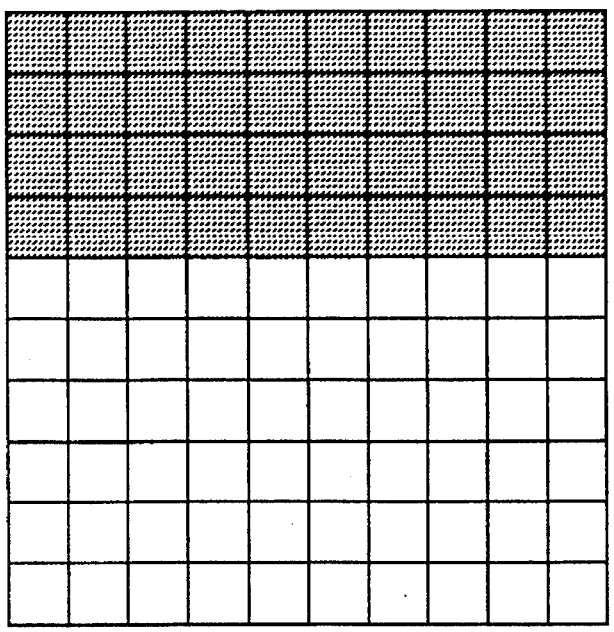
FIGS. 10A and 10B show status of memory blocks in the image memory in the embodiment.
Figure 10B:
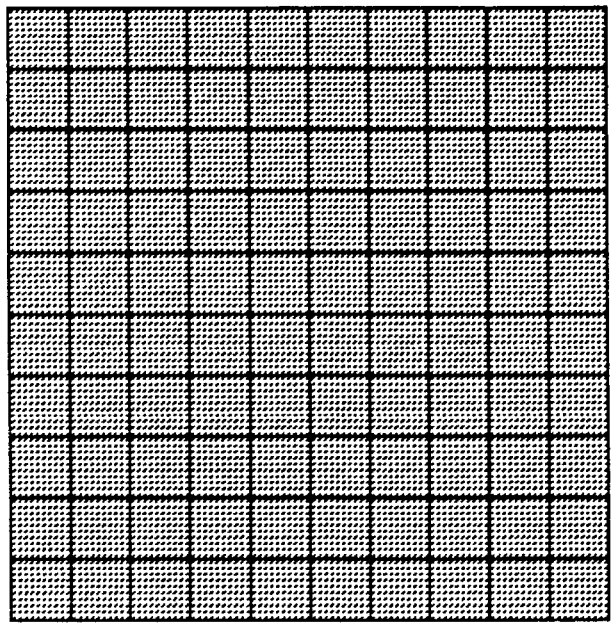

FIGS. 10A and 10B show status of memory blocks in the image memory 307.

In the present embodiment, the image memory 307 is divided into 100 blocks. FIG. 10A shows that 60 blocks are vacant, and FIG. 10B shows the image memory full state. One block has a memory capacity of 8K bytes.

In the present embodiment, the image memory 307 is used by block, and the status of the image memory 307 is controlled by controlling the memory blocks. Namely, the CPU 105 manages the number of vacant memory blocks to determine if the image memory is full or not.

In the present embodiment, since the data in the memory block is erased after the transmission, the memory block becomes vacant and it may be repeatedly used.

The process in the present embodiment is explained in detail with reference to FIGS. 7 and 8.

When the document sheet (or original sheet) is set (S401), the CPU 305 checks if the image memory is full or not (S403). The image memory full state means that the number of vacant block in the memory is zero.

If the image memory is full, the memory full state is displayed on the console panel 312 (S402) and the process is terminated.

If the image memory is vacant, a call is made (S405) to a destination address received from the key pad 313 (S404) through the communication control unit 308. The CPU 305 determines if the connection has been established by the call or not (S406).

If the connection is not established, the CPU 305 determines whether the destination device is busy or not (S407). If it is busy, the busy state is displayed on the console panel 312 (S408) and the input of the destination address is again accepted. If it is not busy, the input of the destination address is also accepted.

If the connection is established, the communication control unit 308 starts the negotiation with the destination device (S409). In the negotiation, a sheet size, a resolution power and a coding system are determined in accordance with a receiving capability of the destination device.

After the negotiation (S410), the scanner unit 310 starts the reading through the I/O control unit (A) 311 is accordance with the sheet size and the resolution power determined in the negotiation (S411).

The block number N is set to "1" (S412) and the block number M is set to "1" (S413). The data is read into (or written in) the N-th block while it is encoded by the encoder 316 by the encoding system determined by the negotiation (S414). Where N and M are equal, it identifies the same memory block.

The CPU 305 determines if the N-th block is the last block or not (S415). If it is not the last block, the CPU 305 determines if the N-th block is in a data full state or not (S416).

If it is in the data full state, the CPU 305 determines if the image memory 307 is full or not (S421) to determine if the data can be read into the next block. If the memory is not full, N is incremented by one (S422) and the data is read into the N-th block (S423).

If the data full state is not detected in S416, the CPU 305 determines whether the entire document has been read or not (S417). When it has been read, the N-th block is designated as the last block (S419) and the reading-in (or writing) is terminated (S420). If the entire document has not been read, the data is further read into the N-th block (S418). Then, the process returns to S415.

If the image memory is full in S421, the memory full state is displayed on the console panel 312 (S424) and the reading-in is interrupted until the memory block becomes vacant (S425).

If the N-th block is the last block in S415, the CPU 305 determines if the M-th block is under transmission or not (S426). If it is not, the M-th block is sent through the communication control unit 308 (S427).

The CPU 305 determines if the transmission of the M-th block has been completed or not (S428). If it has, the CPU 305 erases the data in the M-th block (S429). Thus, the block becomes vacant and can be reused. If the transmission has not been completed, the process returns to S415.

After S429, the CPU 305 determines if the reading-in is being interrupted or not (S430). If it is, the writing is resumed (S431).

The CPU 305 determines if the M-th block transmitted is the last block or not (S432). If it is not the last block, the block number M is incremented by one (S433) and the CPU 305 determines if there is data in the M-th block (S434). If there is, the process returns to S427, and if there is not, the process returns to S415.

If it is the last block in S432, the communication is terminated (S435).

In the present embodiment, the transmission without page-by-page synchronization is attained through the above control.

While the image memory is divided into blocks in the present embodiment, the image memory may be substituted by a hard disk which is divided into sectors.

A memory control operation in the present embodiment is now explained in detail with reference to FIGS. 11 to 15.

Figure 11:
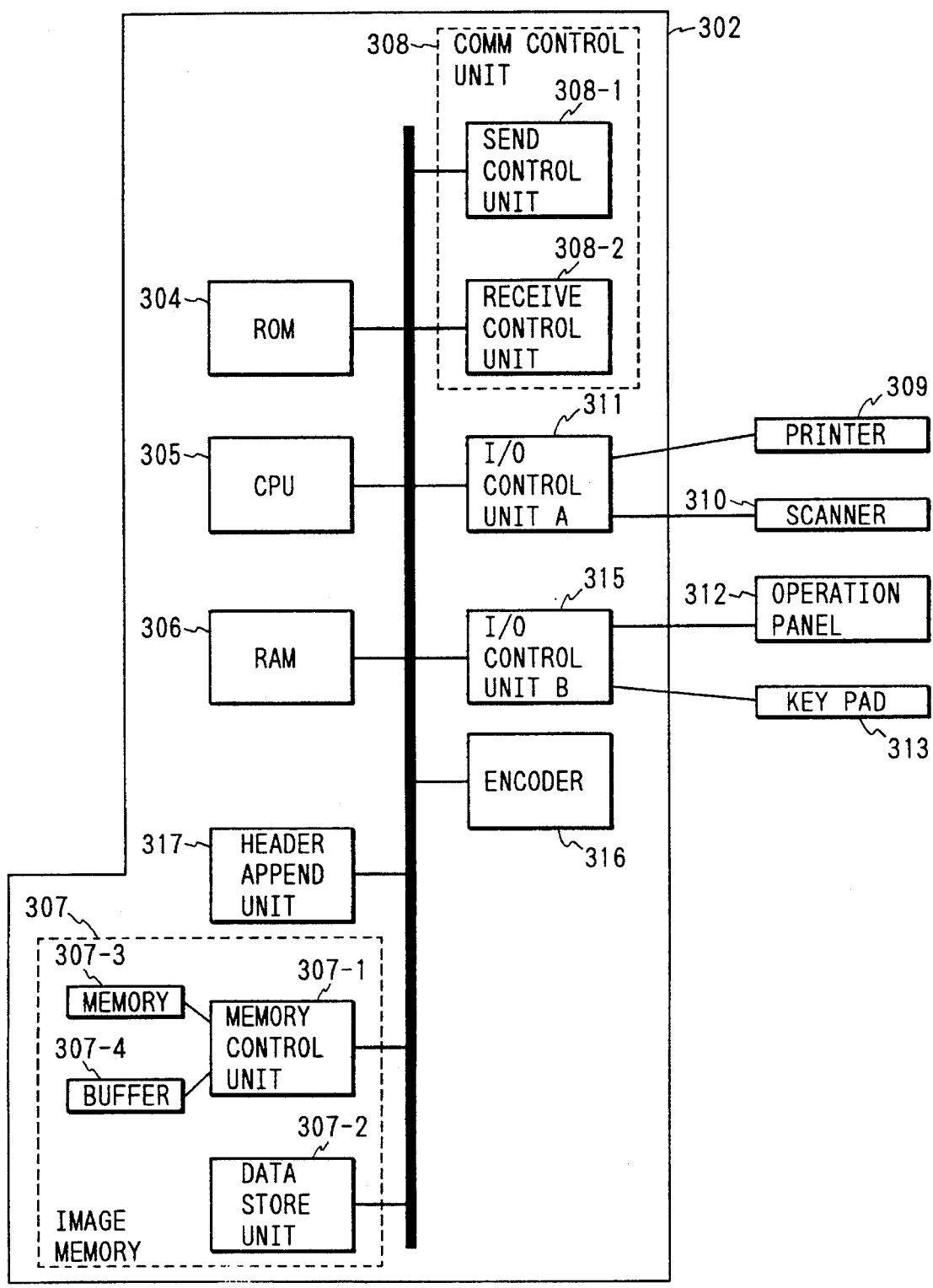
FIG. 11 shows detail of the image memory 307 and the communication control unit.

As shown in FIG. 11, the communication control unti 308 comprises a transmission control unit 308-1 and a reception control unit 308-2.

The image memory 307 comprises a memory control unit 307-1, a data reservation unit 307-2, a memory 307-3 and a buffer 307-4. The memory control unit 307-1 controls memory information, page information and buffer information.

The control of the memory information is first explained.

In the present embodiment, the memory space (memory area) is divided into ten 8K-byte blocks (memory bloks). Those memory blocks are managed by the memory information as shown in FIG. 12A. Numeral 2-1 denotes a pointer for linking the memory information, numeral 2-2 denotes a busy flag for indicating whether the memory block is in use or not, numeral 2-3 denotes a start address of the memory block, and numeral 2-4 denotes data length of the data from the start address, which is 8K bytes at maximum.

The memory information is provided one for each memory block, and 100 memory information are managed in the present embodiment.

When data is to be reserved, the memory information which has "0" (off) in the busy flag 2-2 thereof is searched. If it is detected, the busy flag 2-2 is set to "1" (on) so that the data can be written thereinto. This operation is called acquisition of memory information.

When the memory information is acquired, the data is stored starting from the start address 2-3. If the memory information is not acquired, that is, all busy flags are "1" (on), it indicates that the memory is full. If the data is larger than 8K bytes, the memory information is further acquired to write the data.

In order to assure the order of the data, the pointer 2-1 is linked in the sequence of use.

The memory information thus prepared is linked to the page information.

The management of the page information is now described.

In the facsimile device of the present embodiment, the maximum number of document sheets that can be stored is 120 sheets. The page information is associated with the number of document sheets that can be stored, and there are 120 page information in total.

The page information is formated as shown in FIG. 12B. Numeral 2-5 denotes a pointer for linking the page information, numeral 2-6 denotes a busy flag for indicating whether the page information is in use or not, numeral 2-7 denotes document information which retains an image document size, a resolution and a compression system, and numeral 2-8 denotes a memory information pointer to which the compressed image data is linked.

When the page information is to be reserved, the page information having the busy flag 2-6 which is "0" (off) is searched. If it is detected, the busy flag 206 is set to "1" (on). This operation is called acquisition of the page information.

When the page information is acquired, the document information is stored in the page information. The memory information is acquired so that the image data of that page can be saved.

In the present embodiment, the page buffer 307-4 is used and the buffer information manages the page buffer (FIG. 12C).

The buffer 307-4 is located at a different area from that of the memory 307-3 which saves the image data and it is of 160K byte size which is divided into 20 8K-byte blocks called buffer blocks.

Ten of the buffer blocks form one unit to be assigned to one page, which is called a buffer unit. There are two buffer unit's in total and each buffer unit comprises ten buffer blocks.

The buffer unit is used for each page and it cannot be used across pages.

The buffer block is managed by the buffer information as the memory block is, in the following manner.

Numeral 2-9 denotes a pointer for linking the buffer information, numeral 2-10 denotes a busy flag which indicates whether the buffer block is in use or not, numeral 2-12 denotes a start address of the buffer block, and numeral 2-11 denotes data length of the data from the start address 2-12, which is 8K bytes at maximum.

The buffer information is provided one for each buffer block. Twenty buffer information are managed in the present embodiment.

When the buffer block is to be used, the memory information having the busy flag 2-10 which is "0" (off) is searched. When it is detected, the busy flag 2-10 is set to "1" (on) so that the data can be written. This operation is called acquisition of the buffer information.

If at least one of the buffer blocks in the buffer unit is in use, the unit is in use.

After the use of the acquired information, the busy flag is set to "0" (off) so that it can be acquired again. This operation is called release.

The memory control operation in the transmission mode by the management information is explained below.

The memory control unit 307-1 is accessable by two control units. One is the data reservation unit 307-2 for writing data to the memory control unit 307-1 and the other is the transmission control unit 308-1 for reading data from the memory control unit 307-1.

The data reservation unit 307-2 acquires the information and writes the data. The transmission control unit 308-1 reads the data, sends it to the line and releases the information.

Figure 13:
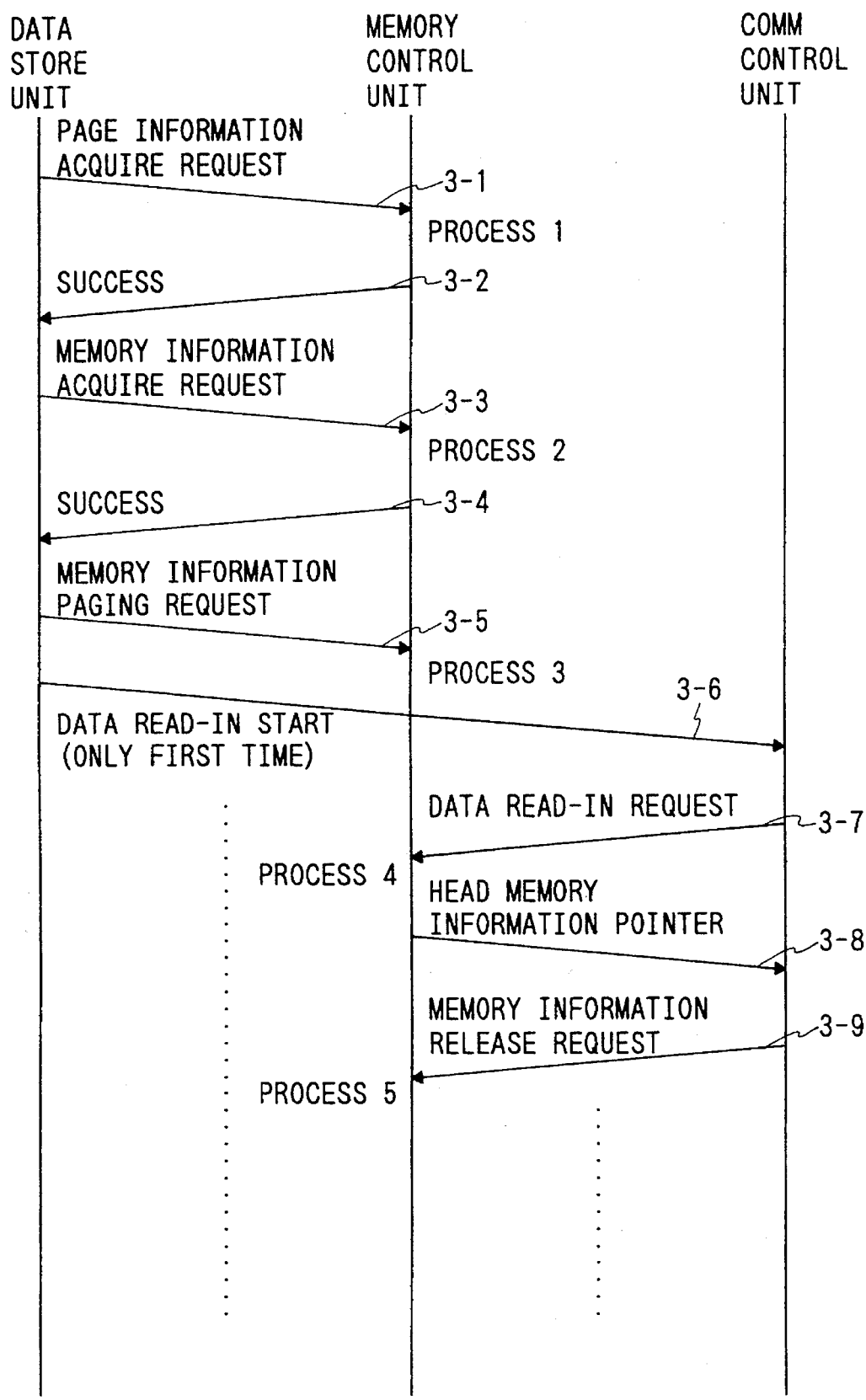
FIG. 13 shows a chart of communication sequence among the memory control unit, a data reservation unit and a transmission control unit.
Figure 14:
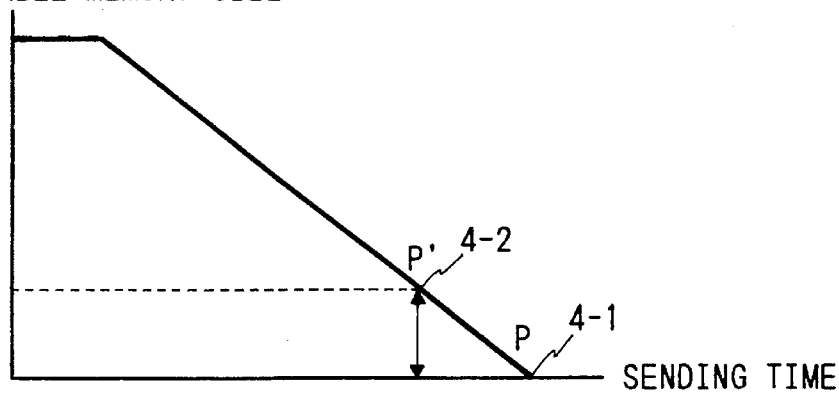
FIG. 14 shows correlation between a remaining memory capacity and a transmission time.

FIG. 13 shows a communication sequence among the memory control unit 307-1, the data reservation unit 307-2 and the transmission control unit 308-1. The communication is executed under the control of the CPU 305.

When the data is to be written, the data reservation unit 307-2 requests the page information acquisition to the memory control unit 307-2 (3-1).

In response to the request for the page information acquisition, the memory control unit 307-1 acquires the page information in the manner described above. When it acquires, it sends an address of the page information to the data reservation unit 307-2 (process 1 in FIG. 13).

The data reservation unit 307-2 then requests the acquisition of the memory information to the memory control unit 307-1 (3-3). In response to the request for the memory information acquisition, the memory control unit 307-1 acquires the memory information. When it acquires, it sends an address of the memory information to the data reservation unit 307-2 (process 2 of FIG. 13).

The data reservation unit 307-2 writes the data starting from the address of the memory block of the acquired memory information.

When the data has been written, or when one memory block becomes full, the data reservation unit 307-2 requests the memory information page link to the memory control unit 307-1 (3-5).

The memory control unit 307-1 links the requested memory information to the previously acquired page information (process 3 in FIG. 13).

In this manner the data is written in the page information. After one page of data has been written, the data reservation unit 307-2 again acquires the page information and writes the data in the manner described above.

The memory control unit 307-1 links the newly acquired page information to the previously acquired page information to keep the page sequence.

The address of the page information acquired by the data reservation unit 307-2 is sent to the transmission control unit 308-1 (3-6).

The transmission control unit 308-1 requests the data writing to the memory control unit 307-1 by using the address of the page information as a parameter (3-7).

The memory control unit 307-1 sends the memory information which is linked to the page information at the page information address sent from the transmission control unit 308-1, to the transmission control unit 308-1 and changes the linkage of the memory information (process 4 in FIG. 13).

The transmission control unit 308-1 reads in (or writes) the data starting from the address of the memory block of the memory information sent from the memory control unit 307-1 and sends the data to the line.

After the reading-in, the transmission control unit 308-1 requests the memory information release to the memory control unit 307-1 (3-9). The memory control unit 307-1 then releases the memory (process 5 in FIG. 13).

In this manner, the memory information acquired and written by the data reservation unit 307-2, and the memory block are written and released by the transmission control unit 308-1.

In the operation of transmission of the data while it is stored in the memory (simultaneous store/transmission), the acquisition and the release for the memory information are repeated during the transmission. However, since the write speed of the data reservation unit is normally higher than the write speed of the transmission control unit, the memory capacity may be short at a point P (4-1) shown in FIG. 14 but in the above operation, the operation may be stopped but the operation is never terminated so long as the processes 2, 3, 4 and 5 are repeated. Even if the memory capacity is short at the point P, the memory information is finally released by the transmission control unit 308-1 so that the use of the memory is permitted.

Thus, during such an operation, the point P is not set at the actual memory full point but set at a point P' (4-2) at which the memory still has a small available area. (In the present embodiment, the point P' is set at 10 memory blocks.)

Thus, since 10 memory blocks always remain, those ten blocks may be used for other operation.

In the present embodiment, those memory blocks are used for reception. Even if some blocks are used for the reception, the success of acquisition is not returned to the data reservation unit 307-2 when the block is released by the transmission control unit 308-1 and so long as the remaining blocks reach ten blocks (process 2).

Where the above control is repeated, the memory information released by the transmission control unit may sometimes be used for the reception so that the writing of the data may not be attained.

Accordingly, during the above operation (send-with-storage mode or simultaneous store/transmission mode), the data is written by using the non-busy buffer unit. Since the buffer unit is used unit by unit as described above, the buffer information cannot be used for the reception even if it is released by the transmission control unit 308-1 (process 2).

When the memory information is released and there are ten or more memory blocks, the data reservation unit 307-2 and the transmission control unit 308-1 again use the memory block (process 2).

In this manner, the memory block and the buffer block are effectively utilized in accordance with the number of remaining blocks and the operation so that the termination of the operation in the course is prevented.

Since the buffer unit used in the present embodiment is used page by page, it cannot be used frequently when the memory information is not acquired because the buffer unit cannot be used across pages. If all of the two buffer units are used up, the data of the next page cannot be written.

Accordingly, as a condition to use the buffer unit, the buffer unit may be used only when the page into which the data is being written and the page from which the data is being read are equal.

A control flow of the CPU 305 which executes the above operation is shown in FIGS. 15A to 15G.

Figure 15A:
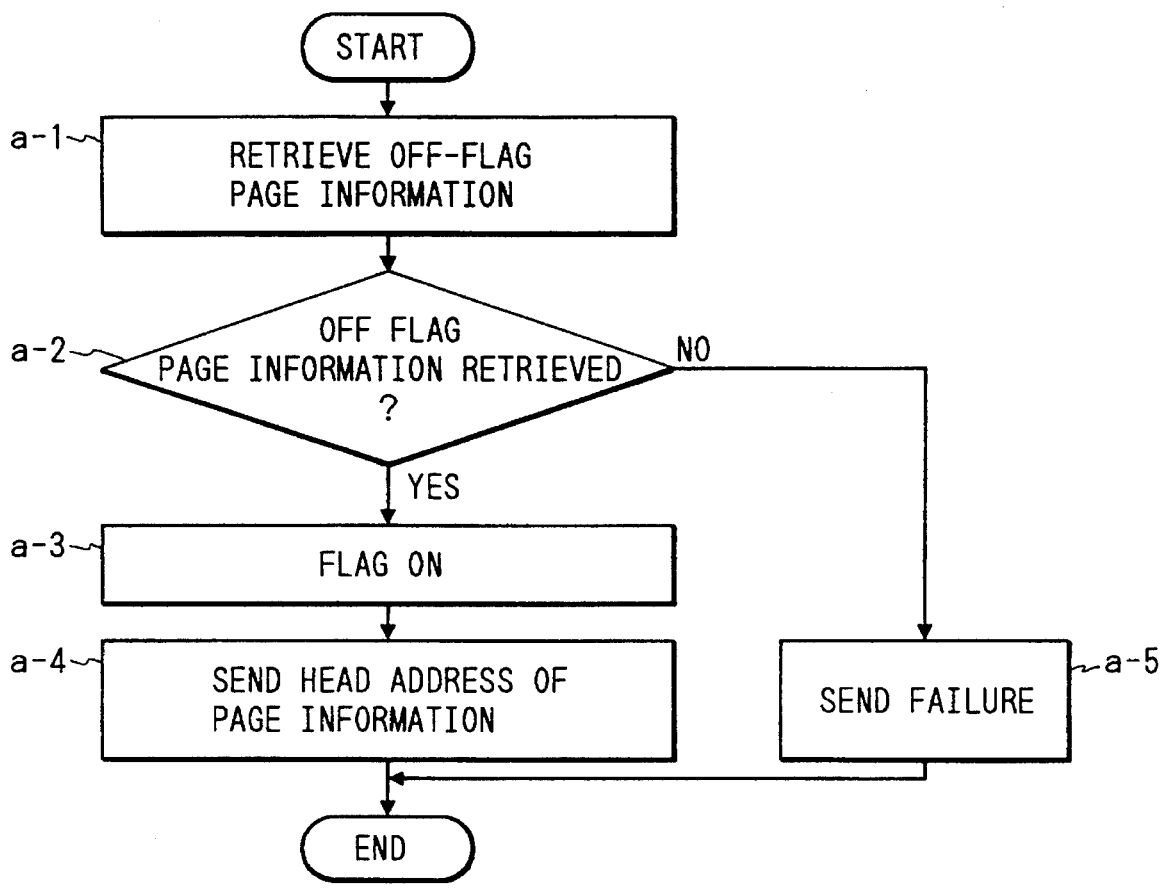

FIG. 15A (process 1) shows a process flow when the memory control unit 307-1 requests the acquisition of the page information.

Figure 15B:
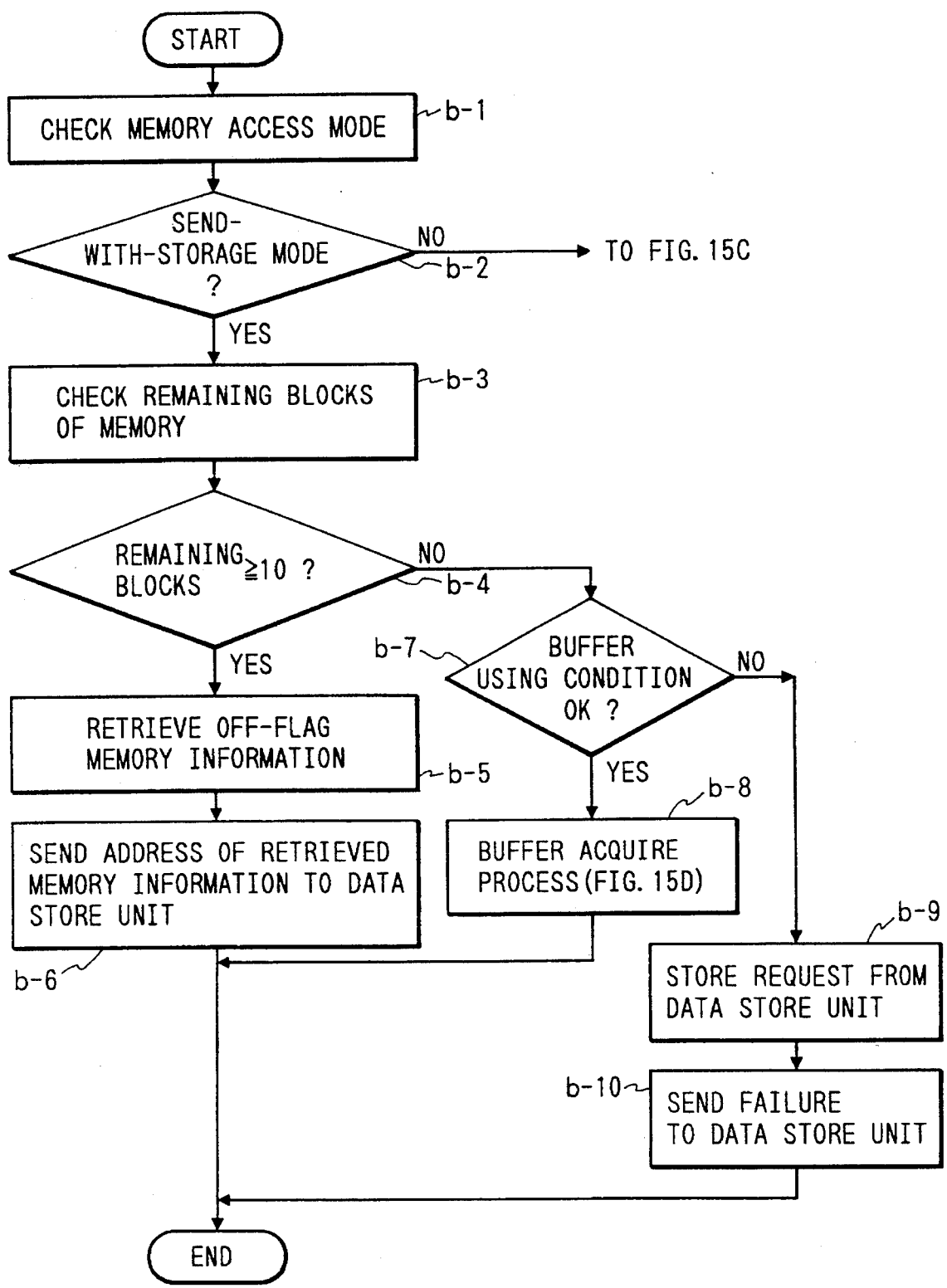
Figure 15C:
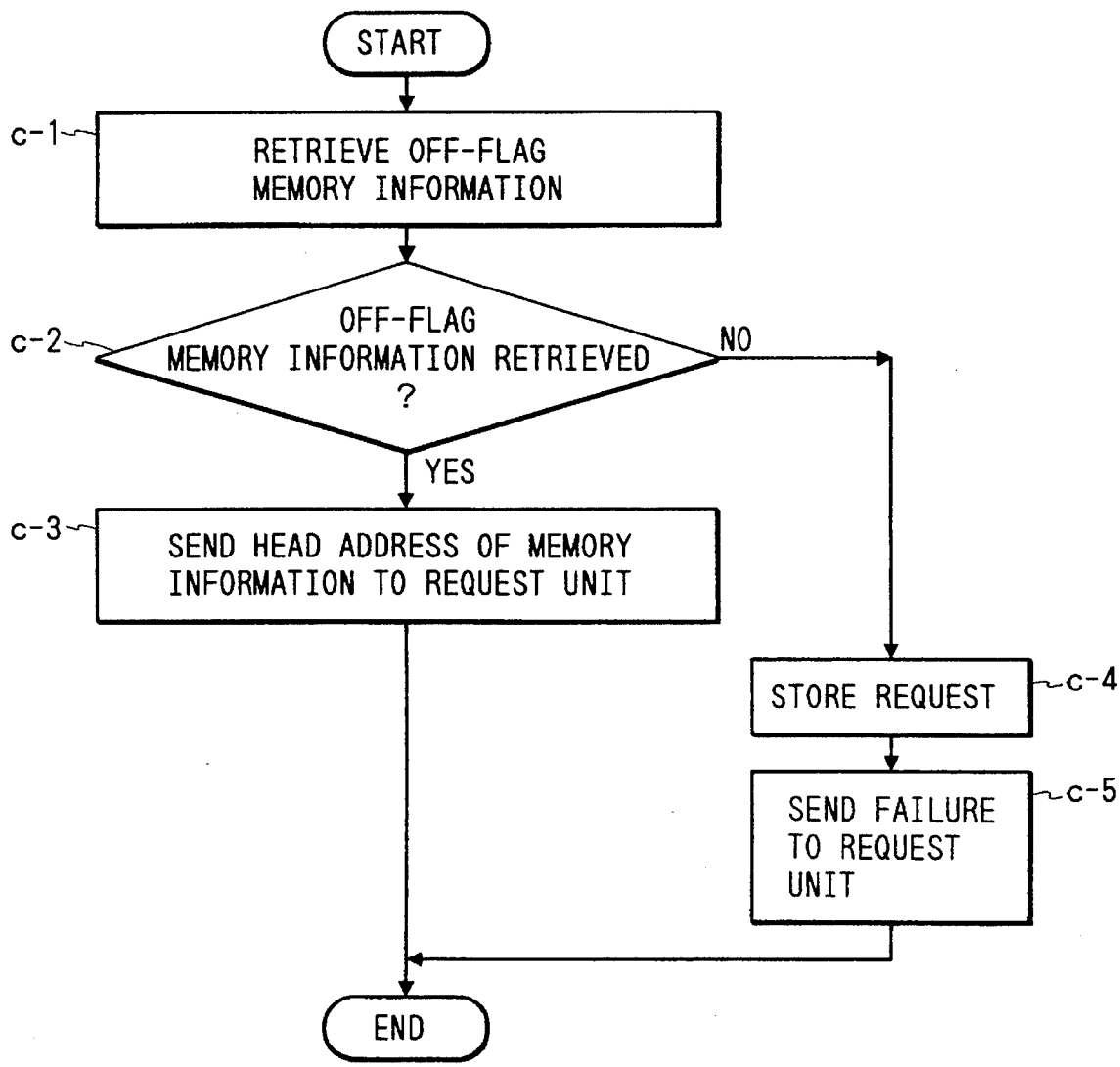

FIG. 15B (process 2), FIG. 15C (process 2-1) and FIG. 15D (process 2-2) show a process flow when the memory control unit 307-1 requests the acquisition of the memory information.

Figure 15E:
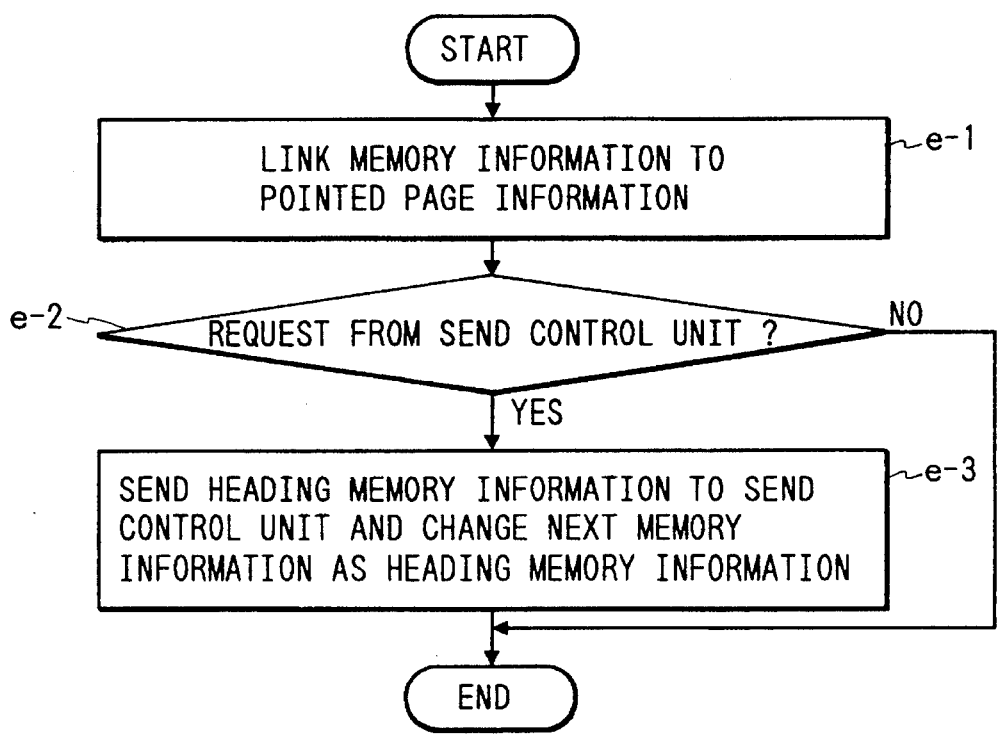

FIG. 15E (process 3) shows a process flow when the memory control unit 307-1 requests the memory information page link.

Figure 15F:
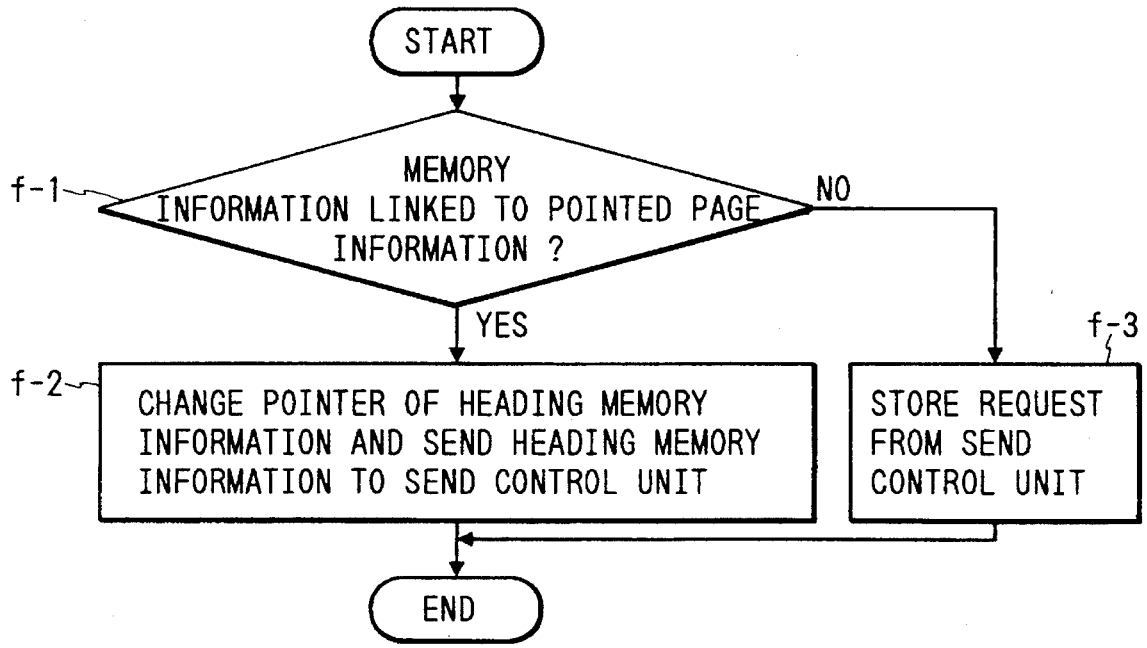

FIG. 15F (process 4) shows a process flow when the memory control unit 307-1 requests the data writing.

Figure 15G:
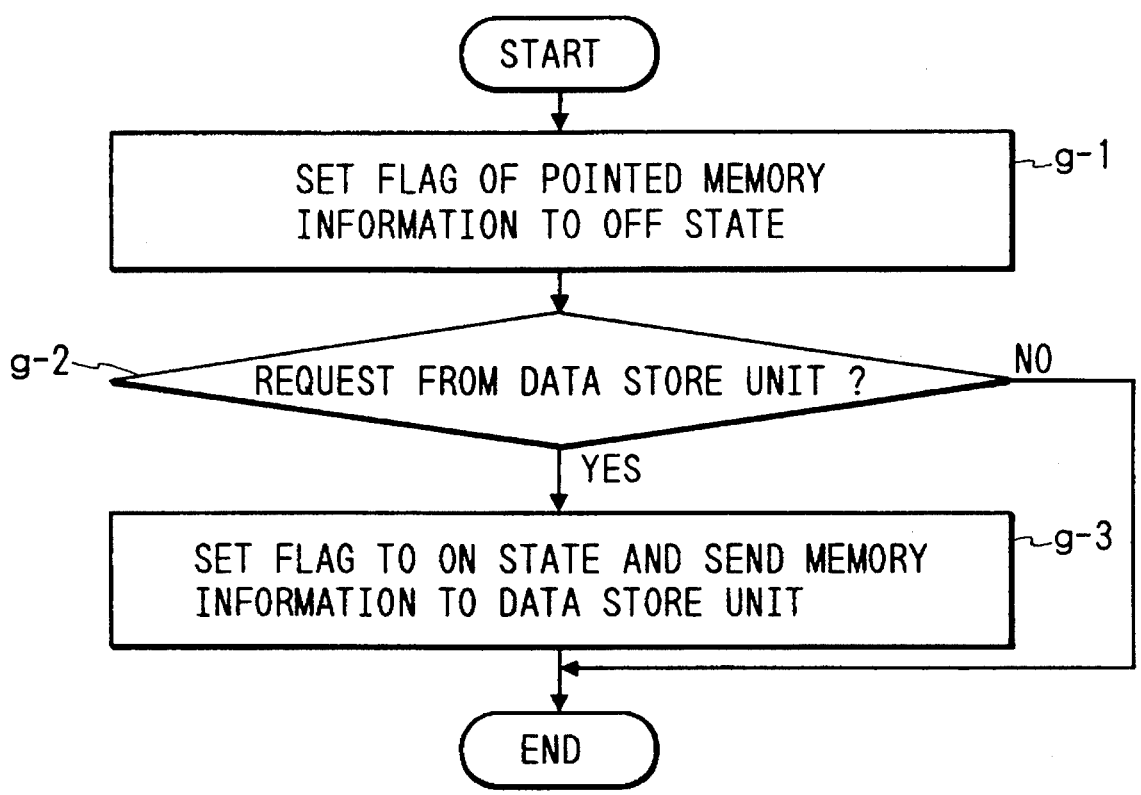

FIG. 15G (process 5) shows a process flow when the memory control unit 307-1 requests the memory information release.

In the present embodiment, the processes 1, 2 and 3 are requested by the data reservation unit 307-2, and the process 4 and 5 are requested by the transmission control unit 308-1.

In the process 1, when the page information acquisition is requested, the page information having the busy flag which is "0" (off) is searched (a-1). Then, whether the page information having the off flag has been detected ! or not is checked (a-2). If it is, the busy flag thereof is set to "1" (on) (a-3) and the success in acquiring the page information and the address of the page information are returned to the data reservation unit (a-4). If it is not acquired, the failure to acquisition (or Non-Acquire) is returned (a-5).

In the process 2, upon request of the memory information acquisition, the content of the access to the memory 307-3 is checked (b-1). Whether it is the send-with-storage mode or not is checked (b-2), and if it is, the number of remaining blocks of the memory is checked (b-3). Whether the number of remaining blocks is ten or more or not is checked (b-4), and if it is ten or more, the memory information busy flag is searched (b-5), and the address of the retrieved memory information and the success of the memory information acquisition are returned to the data reservation unit (b-6). If the operation is not the send-with-storage mode, the process 2-1 is executed. If the number of remaining blocks is less than ten in (b-4), whether-the condition to use the buffer 307-4 is met or not is determined (b-7). The condition to use the buffer 307-4 has been described above. If the buffer 307-4 may be used, the process 2-2 is executed to acquire the buffer (b-8). If the buffer may not be used in (b-7), the request from the data reservation unit 307-2 is stored (for the confirmation in the process 5) (b-9) and the failure of the memory information acquisition is returned to the data reservation unit 307-2 (b-10).

In the process 2-1, the operation which is not the simultaneous store/transmission is executed. The memory information having the off busy flag is first searched (c-1). Whether the memory information having the off busy flag has been detected or not is checked (c-2), and if it is detected, the address of the memory information and the success of the memory information acquisition are returned to the data reservation unit (c-3). If it is not detected, the request from the data reservation unit 307-2 is stored (c-4) and the failure of the memory information acquisition is returned (c-5).

In the process 2-2, the buffer is acquired. The buffer information having the off busy flag is searched (d-1), and whether the buffer information having the off busy flag has been detected or not is checked (d-2). If it is detected, the address of the buffer information and the success of the buffer information acquisition are returned to the data reservation unit (d-3). If it is not detected, the request form the data reservation unit 307-2 is stored (d-4) and the failure of the buffer information acquisition is sent (d-5).

In the process 3, upon request of the memory information page link, the memory information is linked to the designated page information (e-1) and the request of the data writing from the transmission control unit 308-1 is checked (e-2). If the request has been issued, the memory information at the head address is linked to the next memory information and the memory information at the head address is sent to the transmission control unit 308-1 (e-3).

In the process 4, upon request of the data reading-in, whether the memory 307-3 is linked to the designated page information or not is checked (f-1). If it has already been linked by the link request by the data reservation unit 307-2, the memory information at the head address is linked to the next memory information and the memory information at the head address is sent to the transmission control unit (f-2). If it has not been linked, the request of the transmission control unit 308-1 is stored (f-3).

In the process 5, upon request of the memory information release, the busy flag of the designated memory information is set to "0" (off) (g-1) and the request for the memory acquisition from the data reservation unit 307-2 is checked (g-2). If the request has been issued, the busy flag of the memory information is set to "1" (on) and the address of the memory information and the success of the memory information acquisition are sent to the data reservation unit 307-2 (g-3).

While the memory control in the transmission mode of the facsimile device has been explained in the present embodiment, a similar process may be applied to a receiving operation having the above characteristic.

The present invention is not limited to the above embodiment but various modifications may be made.

What is claimed is:

1. A facsimile device comprising:

input means for inputting image data representing a document image, the image data being divided into blocks, each containing a predetermined amount of data;

receiving means for receiving image data, the image data being divided into blocks, each containing a predetermined amount of data;

memory means for storing image data;

memory control means for writing/reading the image data input through said input means and the image data received by said receiving means into/from said memory means for each block; and transmitting means for transmitting onto a line the image data read from said memory means, block by block, by said memory control means, wherein during reception of data by said receiving means, said memory control means reserves a predetermined number of empty blocks in said memory means, to accommodate image data being received, and stores the image data input through said input means in a remaining area of said memory means.

2. A facsimile device according to claim 1, wherein said memory control means stores the image data received by said receiving means in the reserved blocks.

3. A facsimile device according to claim 1, wherein said input means includes reading means, for reading a document, and image and encoding means, for encoding image data obtained by said reading means, and wherein said memory control means, which controls image data input through said input means and image data received by said receiving means, causes said encoding means to encode the image data and store the encoded image data in said memory means, after a reading resolution of said reading means and an encoding method to be used by said encoding means are determined on the basis of a procedure signal received by said receiving means.

* * * * *

UNITED STATES PATENT AND TRADEMARK OFFICE
CERTIFICATE OF CORRECTION

PATENT NO. : 5,457,544
DATED : October 10, 1995
INVENTOR(S) : Masato Ochiai

It is certified that error appears in the above-indentified patent and that said Letters Patent is hereby corrected as shown below:

Title page, item [56] Reference cited

"3070359 3/1991 Japan" should read --3-070359 3/1991 Japan--.

COLUMN 9

Line 27, "!" should be deleted.

Line 45, "whether-the" should read --whether the--.

Signed and Sealed this

Twenty-third Day of January, 1996

Attest:

BRUCE LEHMAN

Attesting Officer    Commissioner of Patents and Trademarks